United States Patent Office 3,511,878
Patented May 12, 1970

---

3,511,878
DIFLUOROAMINOMETHYL TRINITROETHYL UREA DERIVATIVE
Andrew Harper Dinwoodie, Dalry, and Godfrey Fort, Ardrossan, Scotland, assignors, by mesne assignments, to the United States of America, as represented by the Secretary of the Navy
No Drawing. Filed Mar. 10, 1967, Ser. No. 622,078
Claims priority, application Great Britain, Apr. 7, 1966, 15,736/66
Int. Cl. C07c *127/00*
U.S. Cl. 260—553         5 Claims

ABSTRACT OF THE DISCLOSURE

This invention relates to a new urea derivative, N,N'-bis(difluoraminomethyl)-N,N' - bis(2,2,2 - trinitroethyl) urea, $(O_2N)_3CCH_2N(CH_2NF_2).CO.N(CH_2NF_2)CH_2C(NO_2)_3$ useful as an energetic constituent in high-energy propellant compositions and to processes for its preparation.

---

According to the invention N,N' - bis(difluoraminomethyl)-N,N' - bis(2,2,2 - trinitroethyl)urea may be prepared by reacting N,N'-bis(2,2,2-trinitroethyl)uron, or a derivative thereof wherein the dimethylene ether bridge is hydrolysed to form a urea derivative having hydroxymethyl or esterified or etherified hydroxymethyl groups, with difluoramine in an inert atmosphere and in the presence of an acidic condensing agent. The term "inert atmosphere" is used to denote an atmosphere substantially free from any constituent, such as oxygen, which reacts with difluoramine. Such an atmosphere may conveniently be obtained by flushing the apparatus initially with nitrogen, and maintaining a steady stream of nitrogen through the apparatus during the reaction.

The reaction may be represented as

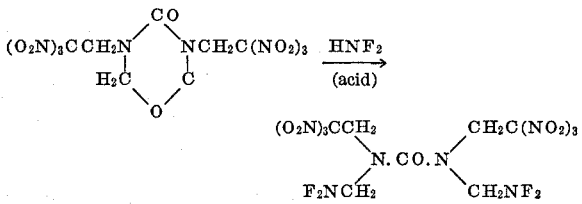

N,N'-bis(2,2,2-trinitroethyl)uron used as starting material in the above reaction may be prepared as described in our co-pending application Ser. No. 622,030, filed Mar. 10, 1967, by the action of nitroform on N,N'-bis(hydroxymethyl)uron or its ether derivatives.

The preferred acidic condensing agent is concentrated sulphuric acid of 80–100% strength by weight, but oleum of up to 65% strength by weight is also convenient. Other condensing agents which may be used include halogenosulphonic acids, for example, fluorosulphonic acid or chlorosulphonic acid.

The reaction may conveniently be carried out either under autogenous pressure at room temperature, or under atmospheric pressure at a lower temperature. A convenient procedure is to use excess difluoramine and to carry out the reaction under conditions of difluoramine reflux at atmospheric pressure, the reflux temperature being about —23° C.

The compound of the invention is a crystalline solid which burns rapidly on ignition and explodes on percussion. It is a useful energetic constituent of high-energy propellant compositions.

The invention is further illustrated by the following examples in which all parts and percentages are by weight.

EXAMPLE 1

4.01 parts of N,N'-bis(2,2,2-trinitroethyl)uron were refluxed with approximately 40 parts of difluoramine for 1 hour. 74 parts of 96–98% sulphuric acid were then added dropwise and the reflux continued for 9 hours. After removal of the excess difluoramine and pouring the reaction mixture on to 500 parts of crushed ice, 4.17 parts of solid crude N,N'-bis(difluoroaminomethyl)-N,N'-bis(2,2,2-trinitroethyl)urea were filtered off from the aqueous reaction mixture. The crude material was washed with 5% aqueous sodium acetate and with water, dried and finally purified by recrystallisation from aqueous ethanol. The purified N,N' - bis(difluoraminomethyl)-N,N'-bis(2,2,2-trinitroethyl)urea was obtained as colourless needles melting to a clear liquid at 108–109° C. It contained: C, 17.0%; H, 1.85%; F, 14.5; N, 26.5%. N,N'-bis(difluoraminomethyl)-N,N' - bis(2,2,2 - trinitroethyl)urea, $C_7H_8F_4N_{10}O_{13}$, requires: C, 16.3%; H, 1.6%; F, 14.7%; N, 27.1%.

The infra-red spectrum of the product showed strong absorptions at $5.9\mu$ due to =CO, at $6.3\mu$ due to —$NO_2$ and a strong band at $11.6\mu$ and weaker bands at 10.85 and $11.8\mu$ due to —$NF_2$. There were other strong absorptions at 7.7, 7.8, 8.2 and $12.7\mu$ and weaker absorptions at 7.15, 7.6, 9.25, 9.9, 12.2, 12.5 and $13.95\mu$.

The proton magnetic resonance spectrum at 60 megacycles/sec. of the product in acetone solution, using tetramethylsilane as internal reference, showed a triplet centered at $4.70\tau$ (J=23 cycles/sec.) assigned to the hydrogen nuclei of the difluoraminomethyl groups, and also three peaks at 4.84, 4.62 and $4.35\tau$ assigned to the magnetically non-equivalent hydrogen nuclei of the trinitroethyl groups. Deuteration of the solution showed that no —NH or —OH groups were present. The $^{19}$F nuclear magnetic resonance spectrum at 56.458 megacycles/sec. of the compound in acetone solution, using trichlorofluoromethane as internal reference, showed a triplet centred at $—45.1\delta$ (J=23 cycles/sec.) assigned to the fluorine nuclei of the difluoraminomethyl group.

The product exploded on percussion. In an impact sensitivity test described in which a ½ kilogram mild steel hammer was dropped from various heights on to crystals of the product on a mild steel anvil, explosions occurred when the height was 10 cm. but not when it was 5 cm. When a 0.1 g. sample was heated in an open round-bottomed glass tube at a rate of 5° C. per minute, it exploded when the temperature reached 169° C.

EXAMPLE 2

3.0 parts of N,N'-di(acetoxymethyl)-N,N' - bis(2,2,2-trinitroethyl)urea were treated with approximately 40 parts of difluoramine and 74 parts of 96–98% sulphuric acid in the manner described in Example 1. 2.6 parts of crude N,N'-bis(difluoraminomethyl)-N,N' - bis(2,2,2-trinitroethyl)urea were separated by filtration of the diluted reaction medium. Recrystallisation from aqueous ethanol removed traces of N,N'-bis(2,2,2-trinitroethyl)-uron to give pure N,N'-bis(difluoraminomethyl)-N,N'-bis(2,2,2-trinitroethyl)urea, M.P. 108–9° C., identical to that obtained by the method described in Example 1.

What we claim is:
1. N,N˙ - bis(difluoraminomethyl) - N,N' - bis(2,2,2-trinitroethyl)urea.
2. A process for the preparation of N,N'-bis(difluoraminomethyl) - N,N' - bis(2,2,2-trinitroethyl)urea which comprises reacting a member of the group consisting of N,N'-di(acetoxymethyl) - N,N' - bis(2,2,2 - trinitroethyl)- urea and N,N'-bis(2,2,2-trinitroethyl)uron with difluoramine in an inert atmosphere and in the presence of an acidic condensing agent selected from the group consisting of concentrated sulphuric acid of 80–100% strength by weight, oleum of up to 65% strength by weight and a halogenosulphuric acid, said reaction being conducted in the presence of excess difluoramine and under conditions of difluoramine reflux at atmospheric pressure.

3. A process as defined in claim 2, wherein the acidic condensing agent is sulphuric acid of 80–100% strength by weight.

4. A process as defined in claim 3, wherein N,N'-bis(2,2,2-trinitroethyl)uron is reacted with difluoramine.

5. A process as defined in claim 3, wherein N,N'-di(acetoxymethyl) - N,N' - bis(2,2,2 - trinitroethyl)urea is reacted with difluoramine.

References Cited

UNITED STATES PATENTS 3,375,259   3/1968   Gibson et al. _____ 260—553

LEON ZITVER, Primary Examiner

M. W. GLYNN, Assistant Examiner

U.S. Cl. X.R.

149—92